United States Patent [19]

Nienberg

[11] 4,166,351

[45] * Sep. 4, 1979

[54] AGRICULTURAL DO-ALL MACHINE

[76] Inventor: Raymond F. Nienberg, Box 44, Glandorf, Ohio 45848

[*] Notice: The portion of the term of this patent subsequent to Jul. 27, 1993, has been disclaimed.

[21] Appl. No.: 697,860

[22] Filed: Jun. 21, 1976

Related U.S. Application Data

[63] Continuation-in-part of Ser. No. 486,060, Jul. 5, 1974, Pat. No. 3,971,446, which is a continuation-in-part of Ser. No. 309,156, Nov. 24, 1972, abandoned.

[51] Int. Cl.$^2$ ............................................. A01D 45/00
[52] U.S. Cl. ....................................... 56/192; 56/16.4; 56/158
[58] Field of Search ......... 56/157, 15.5, 228, 153–162, 56/192, 16.4; 214/83.1; 172/456, 311; 198/570, 581, 511, 512, 313, 314, 317, 419, 448, 865

[56] References Cited

U.S. PATENT DOCUMENTS

| | | | |
|---|---|---|---|
| 1,686,828 | 10/1928 | MacGregor | 56/228 |
| 2,321,387 | 6/1943 | Jackson | 198/587 X |
| 2,674,082 | 4/1954 | Ryden | 56/14.4 X |
| 2,700,859 | 2/1955 | Vigum et al. | 56/11.9 |
| 2,743,932 | 5/1956 | Wester | 198/313 |
| 2,782,943 | 2/1957 | Jones et al. | 198/317 X |
| 2,976,936 | 3/1961 | Fry | 171/126 |
| 3,262,505 | 7/1966 | Brokhage | 172/456 |
| 3,971,446 | 7/1976 | Nienberg | 172/456 |

*Primary Examiner*—Russell R. Kinsey
*Attorney, Agent, or Firm*—William P. Hickey

[57] ABSTRACT

An agricultural do-all machine for performing multiple farming operations including harvesting and loading crops into a tow behind vehicle. The do-all machine, briefly described, comprises a vehicle frame designed around an underbelly conveyor having crop clearance therebetween, and a pair of opposite hand implement support booms carrying belt conveyors which feed crops laterally onto the underbelly conveyor. The underbelly conveyor moves the crop underneath the frame of the machine to another vehicle following behind the agricultural do-all machine.

19 Claims, 18 Drawing Figures

AGRICULTURAL DO-ALL MACHINE

The present application is a continuation-in-part application of co-pending application Ser. No. 486,060, filed July 5, 1974 now U.S. Pat. No. 3,971,446 which in turn is a continuation-in-part of the co-pending application Ser. No. 309,156, filed Nov. 24, 1972, and now abandoned.

BACKGROUND OF THE INVENTION

In the early days of the Industrial Revolution when heat engines were first invented, they were adapted for agricultural purposes by using them to drive winches at fixed locations to pull cables across the field. Various implements, of course, were attached to the cables. The next change which was suggested, was to house the engines on large bridge structures which could either be pulled across the ground, or be driven from stationary engines mounted thereon. With this arrangement, fixed shafting on the bridge structure could be used to operate vertical shafts to which agricultural tools were attached. Such a disclosure is shown, for example, in the early U.S. Romaine Pat. No. 292,511. Obviously, such a structure was cumbersome and unworkable, and the art then moved in the direction of self-propelled traction units called "tractors."

The bulk of the commercially successful prior art agricultural machinery is based on being driven by a propelling vehicle called a "tractor" which supplies the motive force for various draw-behind attachments, each of which performs a separate and distinct agricultural chore, such as tilling, planting, fertilizing, harvesting, etc. In many instances the draw-behind implements are supported on wheels, and the turning of these wheels is used to drive power shafts for the mechanical motion that is necessary on the implement. In other instances the mechanical implement structures are driven from power take offs on the rear of the tractors. In more recent developments, self-propelled implements have been developed wherein a motor is provided on the individual implement to not only make the implement self-propelling, but to drive the mechanical machinery that is a part of the implement. This development took place first in combines for harvesting and thrashing grain, and later was utilized in other harvesting machines for harvesting alfalfa, tomatoes, pickles, etc.

In still another development, the wheels were taken off of the various specialized agricultural implements and the implements were supported from the tractor by means of a three-point hitch to permit greater maneuverability and a shorter turning radius. In general, however, those implements which have been best adapted to the three-point hitch arrangement have been implements of a design which did not contain power driven machinery, but were dragged across the surface of the ground to cultivate the same.

With this background in mind, it is a principal object of the present invention to provide a single do-all machine that does the work of several individual machines, such as a tiller, planter, fertilizer and lime spreader, sprayer and harvester, thus reducing the investment and depreciation involved in separate machines. Whereas the individual machines are used only for a short period each year and remain idle for the rest of the year during which they are depreciating, the present do-all machine can be utilized throughout the year.

Another object is to provide a do-all machine with numerous advantages such as lowering crop production costs, speed up agricultural operations, use minimum tillage, and other many advantages.

Other objects are to provide a do-all machine which is simple in design, inexpensive to manufacture, rugged in construction, easy to use, and efficient in operation.

BRIEF DESCRIPTION OF THE DRAWINGS

These and other objects will be readily evident from a study of the following specification and the accompanying drawings wherein.

DESCRIPTION OF THE PREFERRED EMBODIMENTS

Figure 1:
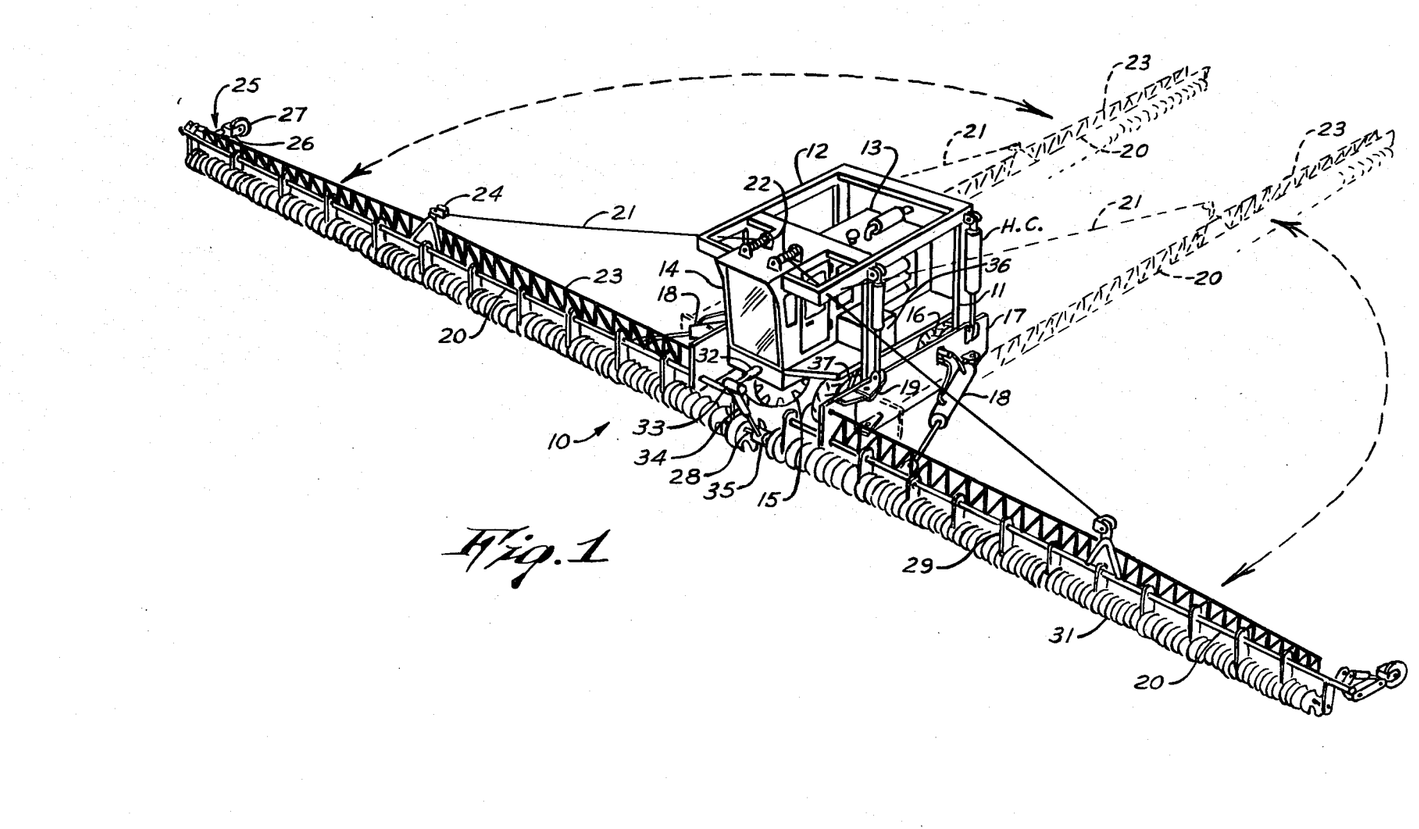
FIG. 1 is a perspective view of a do-all agricultural machine having swingable side booms from which various implements are quickly connected and disconnected, and in which a quick disconnect field cultivator is shown attached.

Referring now to the drawings in detail, FIG. 1 shows a do-all vehicle 10 that includes a power unit frame 11 and an overhead air frame 12. The power unit frame 11 supports an engine 13 and a cab 14 for an operator. The power unit frame 11 is carried upon front traction units or drive wheels 15 and rear traction units or steering wheels 16. A carrier arm frame 17 extends around each side of the power unit frame. A pair of hydraulic cylinders H. C. support the carrier arm frame 17 from the overhead air frame 12. Hinges 19 connect permanent carrier arms 20 to the carrier arm frame 17, and a respective one of a pair of hydraulic cylinders 18 is positioned between a respective side of the carrier arm frame 17 and a respective one of the permanent carrier arms 20 to swing the arms between working and traveling positions. Additionally, each arm is supported by a respective one of a pair of cables 21 operated by a respective one of a pair of winches 22 which are mounted on the top of the air frame 12. The structure of each permanent carrier arm 20 is strengthened by bridging 23 to which an end of a respective cable 21 is attached by a clamp 24. A respective one of a pair of hydraulic cylinders 25 is mounted on the outer end of each arm 20 and is used to raise and lower a respective one of a pair of dolly wheel frames 26 on which is mounted a vertically swingable ground engaging dolly wheel 27 for supporting the end of its arm 20.

Figure 2:
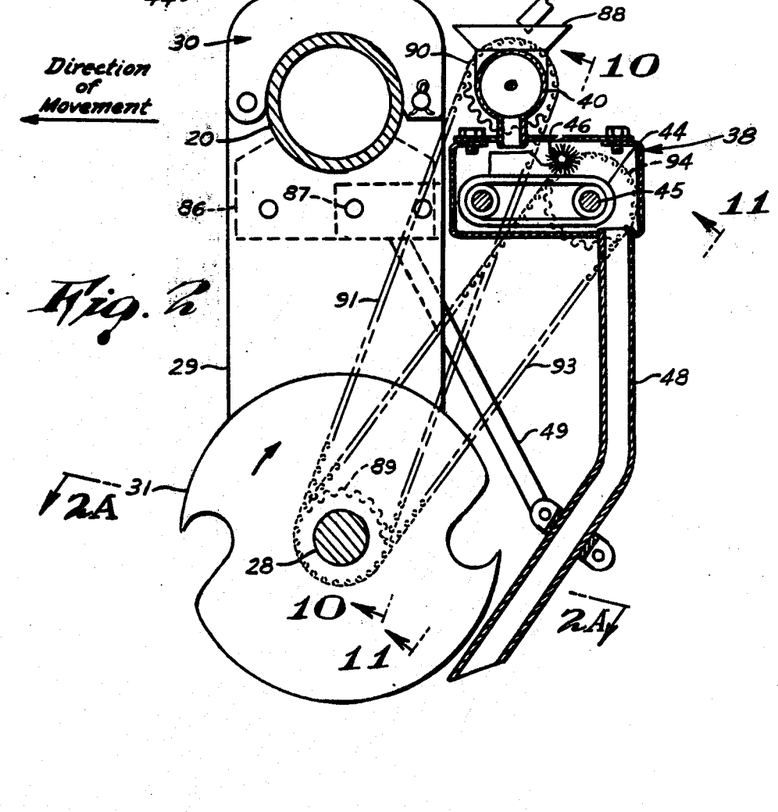
FIG. 2 is a fragmentary sectional view through a planting implement that is quickly attached and detached from the side arms of the do-all machine.
Figure 2A:
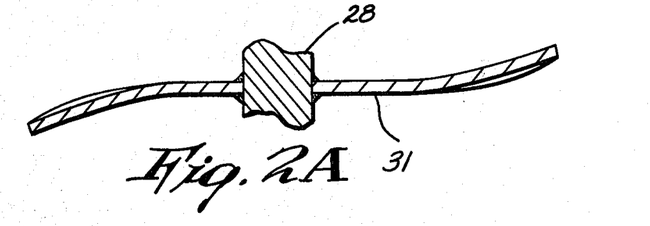
Figure 3:
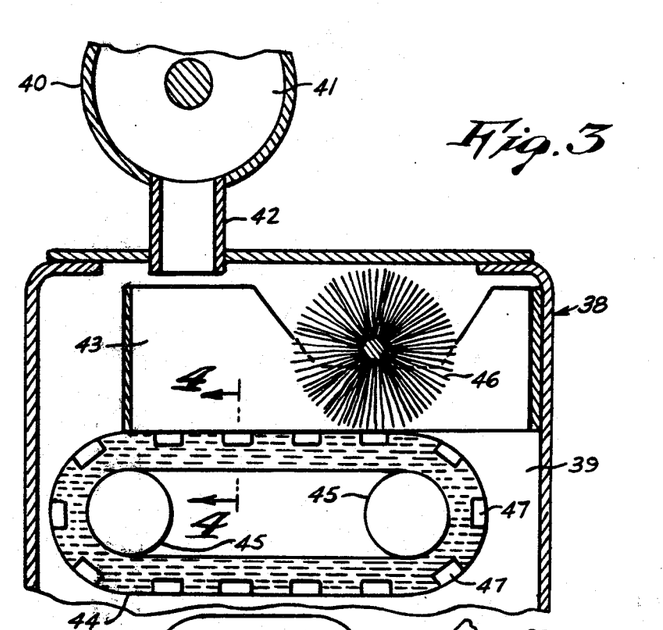
FIG. 3 is an enlarged fragmentary view of a portion of the structure shown in FIG. 2.

The do-all machine so far described is shown in FIG. 1 as carrying the discing and planting attachment shown in FIGS. 2 and 3. The discing attachment shown in FIGS. 1, 2, and 3 comprises opposite hand sections each of which has a long shaft 28 that is journalled in bearings respective ones of which are mounted on respective ones of a plurality of spaced apart frames 29 which are affixed by quick attach clamps 30 to a respective one of the arms 20. A plurality of tilling discs 31 are shown mounted in spaced apart relationship along the shaft 28.

Figures 7, 8:
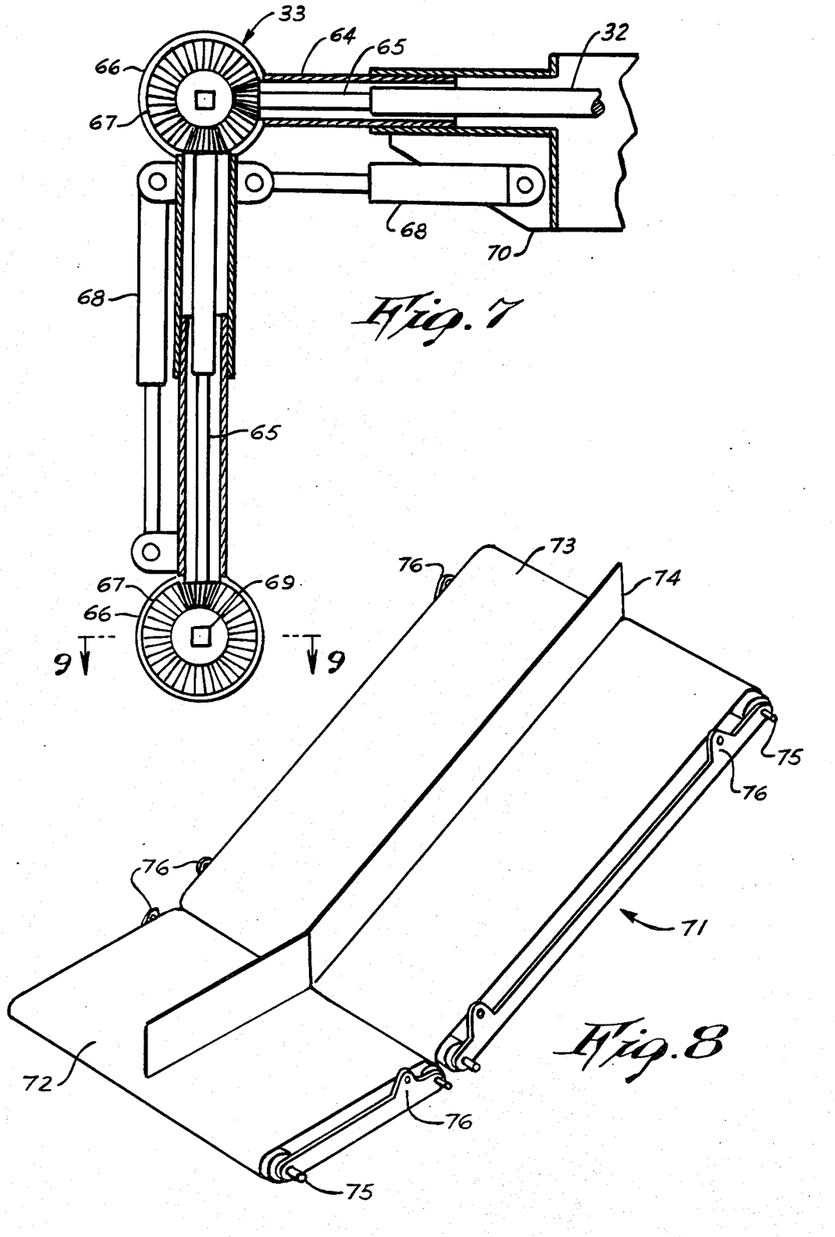
FIG. 7 is a fragmentary cross sectional view taken approximately on the line 7—7 of FIG. 1 and showing an articulated drive structure which is used to drive the rotary elements of the various implements which are attached to the side arms of the do-all machine.
FIG. 8 is a fragmentary view of the underbelly conveyor structure of the machine shown in FIG. 1.

The discing attachment above described is driven by the power take off of the do-all machine shown in FIGS. 1 and 7. The power take off comprises a telescoping power shaft 32 driven from the engine 13 and which extends from the front of the machine. A power shaft differential 33 is positioned on the front of the shaft 32 to drive a telescopic power shaft 34 for in turn driving a power outlet 35 that transfers rotational movement to the shafts 28 of the interchangeable units to be carried on the arms 20. The power take off will later be described in further detail. A removable seed container 36 is shown on the frame 11 and a seed tube 37 extends therefrom to supply the planting attachments about to be described. The dotted lines show the carrier arms swung backwards into their traveling positions.

The planting attachment 38 illustrated in FIGS. 2 and 3 is intended to be used with the discing attachment above described, and includes a planting unit frame 49 for each disc 31. The planting unit frames are fastened to the quick attach clamps of the tillage mechanism which in turn are removably attachable to arms 20. Each planting unit frame 49 includes a seed chamber 39 which is located below a horizontal seed conveyor tube 40 that is positioned behind the carrier arm 20, and which contains a seed auger 41 therein to convey seeds along the tube 40 to the vertical distribution pipes 42 that connect to the chambers 39. The vertical distribution pipes 42 drop the seeds into the hopper bins 43 that are inside the chambers 39. Each hopper bin 43 has a bottom formed by the upper surface of an endless seed belt 44 which moves around seed belt drive shaft 45. An excess seed removal brush 46 sweeps the top surface of the belt to retain all seeds except those which fill the measured cups 47 of the belt 44. The measuring cups 47 of the belt 44 empty over a seed planting tube 48 that delivers the seeds to the rear of the tilling disc 31 which it supplies with seed, so that as the ground is tilled, the seed is planted. The auger 41 can be driven by any suitable means, as for example, by the chain drive shown in FIG. 10. The belt drive shafts 45 can be driven by any suitable means, as by the chain drives shown in FIG. 11.

Figures 4, 5, 6:
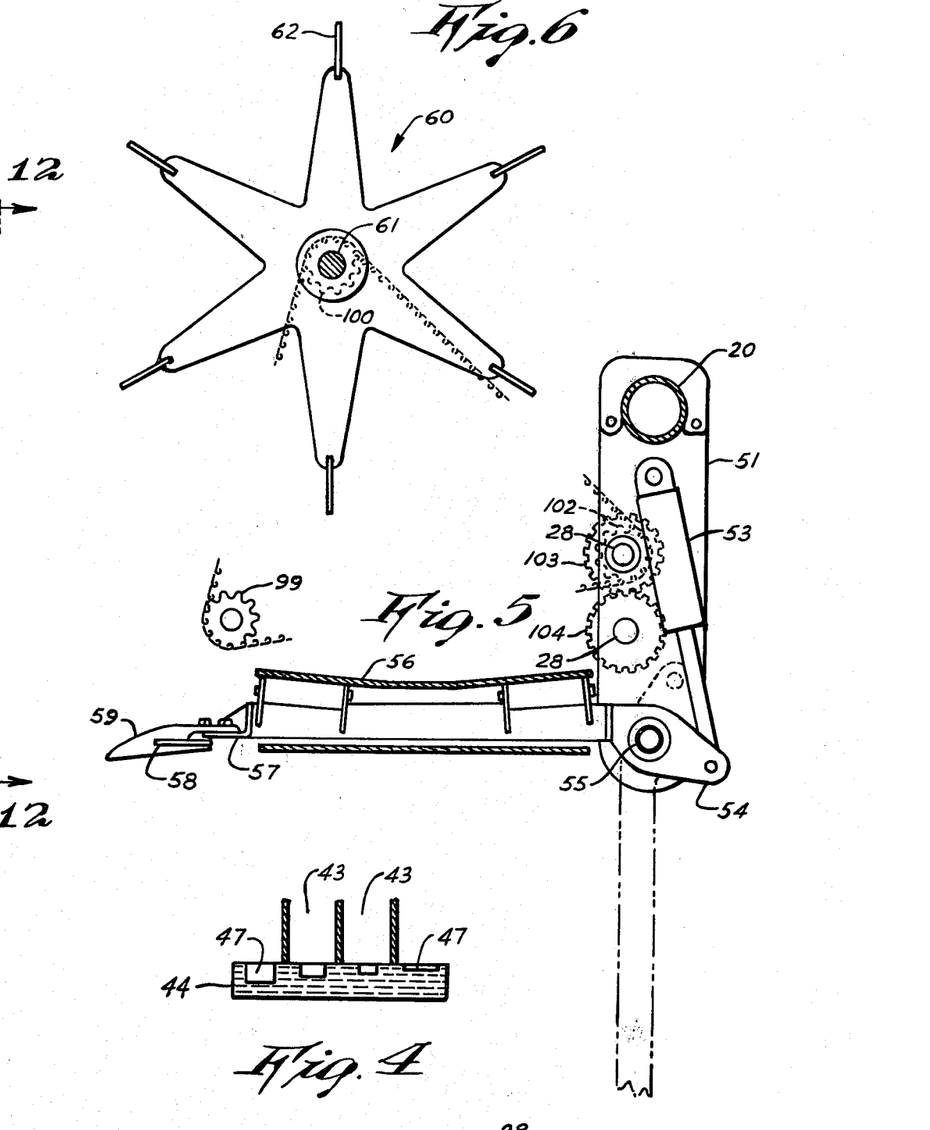
FIG. 4 is a fragmentary sectional view taken approximately on the line 4—4 of FIG. 3.
FIG. 5 is a fragmentary sectional view through a harvesting attachment which can quickly be attached and detached to the side arms of the machine, and which is intended to be used for harvesting grains, grasses, etc.
FIG. 6 is a fragmentary sectional view through a reel structure that is normally used in connection with sickle bar harvesters of the type shown in FIG. 5.
Figure 12:
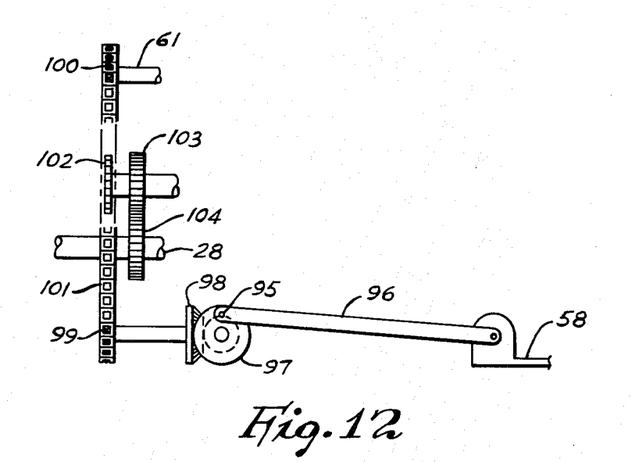
FIG. 12 is a fragmentary elevated view taken approximately on the line 12—12 of FIG. 5 and showing a drive for the sickle bar cutter.
Figure 13:
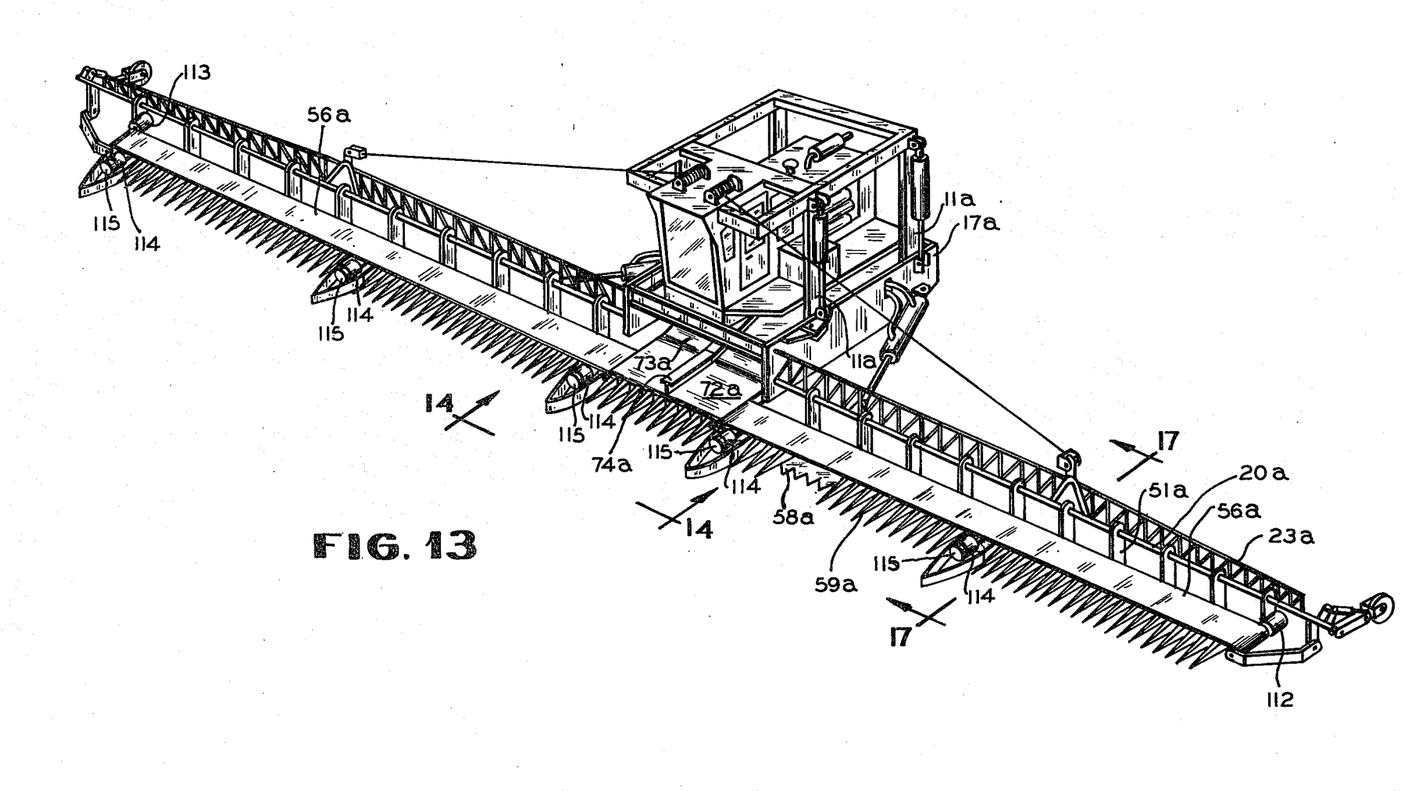
FIG. 13 is a perspective view of another embodiment of the invention which utilizes hydraulic drives for the conveyors and sickle bar cutters.

A harvesting attachment is shown in FIG. 5. This attachment includes a plurality of harvesting unit frames 51 having quick attach clamps 30 for removable securement to the arms 20. Each frame 51 supports a hydraulic cylinder 53 that is connected to a conveyor belt and cutter bar support structure 57. The support structure 57 also carries knife 58, knife guard 59 and an endless conveyor belt 56. The support structures 57 are pivotable about longitudinal shafts 55. A harvesting unit reel 60 is shown in FIG. 6, and is mounted on shaft 61 forwardly of the cutter bar 57, as is well known. The reel includes reel arms, each having a reel paddle 62. The reel 60 and knife 58 are driven in any suitable manner, as for example, by that shown in FIG. 12.

FIG. 8 shows the underbelly conveyor 71 that is used in harvesting and which includes front conveyor 72, elevating conveyor 73, a divider 74, conveyor drives and shafts 75, and attaching eyes 76 for hydraulic cylinders to raise and lower the conveyor. The conveyor transports materials from the harvesting attachments, such as that previously described, underneath the power frame 11, as shown in FIG. 1, to tow behind vehicles.

Figure 9:
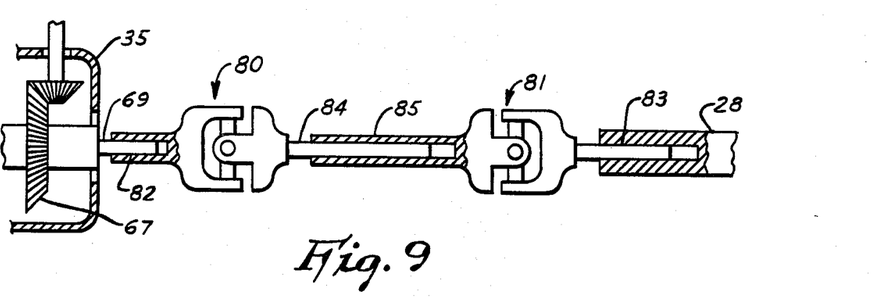
FIG. 9 is a fragmentary sectional view taken approximately on the line 9—9 of FIG. 7 for another embodiment.

As previously indicated, the power transfer unit shown in FIG. 7 is used to drive the shafts 28. In more detail, it includes telescoping drive shaft housings 64, telescoping drive shafts 65, differential housings 66, bevel gears 67, hydraulic cylinders 68, tool shaft drives 69, and power transfer housing brace 70. The oppositely extending tool drive shafts 69 are of square cross section, and the ends of the shafts 28 have square holes therein so that the shafts 28 can telescope over the drive shafts 69 into a driving condition automatically when the arms 29 are swung from the parallel rearwardly extending traveling positions to the perpendicular inline working position. Alternatively, the power outlets 35 can include a pair of universal joints separated by a telescoping shaft as is used in conventional power take offs to permit the shafts 28 to be driven at various angles relative to the normal to the vehicle frame. One such mechanism is shown in FIG. 9 wherein 80 and 81 are spaced apart universal joints having a square holed driving connection 82 and a square driven connection 83 spaced apart by a telescoping square drive shaft 84 that is received in a square tubular driven section 85.

Figure 10:
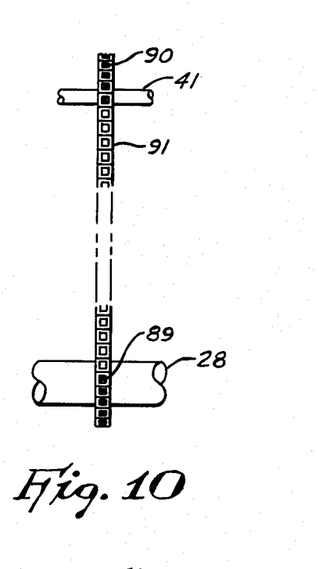
FIG. 10 is a fragmentary sectional view taken approximately on the line 10—10 of FIG. 2 and showing a drive for the shaft 28 of the implements that are attached to the arms 20.
Figure 11:
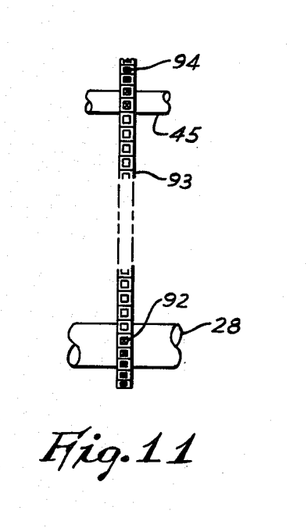
FIG. 11 is a fragmentary sectional view taken approximately on the line 11—11 of FIG. 3.

The seed auger 21 can be driven in any suitable manner, as for example, by that shown in FIG. 10. FIG. 10 shows a sprocket 89 fixed to the shaft 28, and which drives another sprocket 90 on the auger shaft 41 by means of an endless chain 91. The seed belt 44 can be driven in any suitable manner, as for example, by that shown in FIG. 11. FIG. 11 shows a sprocket 92 on the shaft 28 driving a chain 93 which in turn drives a sprocket 94 on the longitudinal seed belt drive shaft 45. The sickle bar knife 58 and reel 60 can be driven in a suitable manner, as for example, by that shown in FIG. 12. The knife 58 is reciprocated by a crank 95 and connecting rod 96. The crank 95 is turned by a bevel gear 97 that is in mesh with another bevel gear 98 and which in turn is driven by a sprocket 99. A sprocket 100 is provided on the reel shaft 61 and the sprockets 99 and 100 are driven by endless chain 101. The endless chain 101 is driven by a sprocket 102 that is connected to gear 103, which in turn is driven by gear 104 on the long implement shaft 28.

Now that the structure of the machine has been described, the operation should be readily apparent to those skilled in the art. The machine is transferred to the field that is to be prepared for planting with the arms 20 swung into their rearwardly extending position, shown by the dotted lines in FIG. 1. These arms are swingable at 90 degrees to a position normal to power unit frame 11, as shown by the solid lines in FIG. 1. After the machine is driven to the starting point in the field, the arms 20 are swung to the inline position shown by the solid lines in FIG. 1. This is accomplished by extending the hydraulic cylinders 18 that are attached to the arms 20. When the arms 20 are in the proper angular position, the power take-off 32 is actuated to start the shafts 28 rotating. While they are rotating, the carrier arm frame 17 is lowered to provide the desired penetration of the discs 31 into the ground following which the winches 22 are actuated to level the outer ends of the arms 20. The hydraulic cylinders 25 are adjusted to help maintain the arms 20 level, after which the vehicle is ready for forward motion through the field.

The do-all machine shown in the drawing is readily adaptable for minimum tillage farming. The discs 31 have two or more notches, best seen in FIG. 2, and the portions of the discs just forward of the notches, i.e., clockwise as seen in FIG. 2, are bent outwardly in alternate directions a slight amount so that the discs will make a thin shallow furrow approximately ½ inch wide and one or two inches deep across the field. The seeding attachment previously referred to drops the seed into this narrow furrow and a suitable drag behind the implement will close the furrow over the top of the seed. Because the do-all machine operates on regularly used paths, fixed row beds soon develop and the ground which is cultivated is never traversed by the heavy equipment. This ground, therefore, does not become compacted and there is no further need for tilling the ground before planting, as has been conventionally practiced. It is intended that spray booms will be attached to the arm 20 to spray herbicide on the fields 4 days before the planting operation and that a premergence herbicide will be applied, either at planting with the spray booms fixed behind the drags previously referred to, or by spraying as a separate operation after the planting operation.

The planting attachments 38 are affixed to the quick attach clamps 30 of the tilling attachment as shown in the drawings. The tubular arms 20 are provided with depending torque-absorbing plates 86, and the planting unit frames 49 are moved sideways so that suitable holes in the frames 49 receive the horizontal pins 87. The planting attachments 38 can then be retained on the pins 87 by any appropriate means, as for example, by cotter pins, not shown, in holes in the horizontal pins 87. It will further be understood that the frames 29 can also be attached to the torque-absorbing plates 86 in similar fashion.

As shown in FIG. 11, the seed augers 41 are driven in synchronism with the shafts 28. Seed is delivered from the containers 36 through the tubes 37 to hoppers 88 which in turn supply the horizontal conveyor tubes 40. The seed from the conveyor tubes 40 fall through the individual vertical distribution pipes 42 to the individual hopper bins 47 where they fall upon the seed distribution and regulating belts 44. Brushes 46 remove all seed from the belt except those within the cups or depressions 47 in the belt: and since the belt is driven in synchronism with the shafts 28, a measured amount of seed is evenly distributed to the seed planting tubes 48. The seed planting tubes 48 are positioned behind the discs 31 as is customary in grain drills, so that they, the seeds, are planted at the proper depth depending upon the vertical setting of the arms 20.

After the planting operation is completed, the do-all vehicle 10 is moved to implement storage racks and the arms 20 raised until the shafts 28 rest upon suitable horizontal supports. The quick attach clamps 30 are opened and the frames 29 are moved laterally off of the pins 87, so that frames 29 come free of the carrier arms 20. Suitable pins, not shown, are removed through the square driven connections 83 in the shafts 28, and the planting attachment is hung on the rack.

When it is desired to harvest the crops, the do-all machine 10 is moved to another rack where the harvesting attachment shown in FIGS. 5 and 6 is supported. The harvesting attachment is installed in a manner similar to that described above for the planting attachment, and the machine is then moved into the field in position for the harvesting operation. The harvesting implement will vary somewhat according to the particular crop which is to be harvested, using known technology. Since most crops will require a severing and conveying operation, the harvesting implement shown in the drawings includes a sickle bar cutter and a conveyor for transferring the severed material to the underbelly conveyor 70 of the do-all machine. In order to be sure that the crops will be positively moved to the conveyor 56, a harvesting reel 60 is used to cause the severed material to lay down upon the conveyor belt 60. The operation of the sickle bar cutter knife 58, conveyor 56 and reel 60 is similar to that of conventional equipment, but the harvesting equipment differs from conventional equipment in the manner in which it is supported and attached to the arms 20. This has been discussed above several times for the other types of attachments previously described.

It is obvious that the do-all implements can be easily and quickly positioned vertically relative to the ground. This can be done automatically by hydraulic servomechanisms, similar to those used on conventional equipment. All of the severed crop material is moved rearwardly under the power unit frame 11 by means of the underbelly conveyor 71 to locations behind the do-all machine vehicle wherein they are conveyed upwardly into tow-behind wagons.

Using the no-tillage arrangement made possible by the present invention, it is visualized that fertilizer will be spread in the winter time when the ground is frozen by conveyor belts supported from the arms 20 and that no cultivation will be required between planting and harvesting because of the applications of the herbicides before and after planting. The natural freezing and thawing of the ground will loosen it sufficiently for the planting operation, since no compaction of the soil is ever involved; and the stubble left by the harvesting operation will provide an ideal shading for the tender seeds upon germination.

The present invention is not limited to such a no-tilling operation. By use of the extensible drive shown in FIG. 9 it is possible to operate the arms 20 in a position swung rearwardly from the inline position shown in FIG. 1. In this position, the discs will perform a conventional discing operation, and when such is desired, the discs are preferably rotated in the opposite direction shown in FIG. 2 so that they tend to provide a forward pulling action for the machine. Conventional drags can be attached to the booms behind the arms 20, and the hydraulic cylinders of the drags can be actuated to increase or decrease the dragging action to a point where it generally offsets the pulling action of the forwardly rotating discs 31.

Also, if the machine is to be used for conventional operations, a cultivating attachment can be attached to the arms 20. The drill machine is ideally suited to a power driven rotary hole arrangement for cultivating the earth between the row crops.

It will now be apparent that the objects heretofore enumerated, as well as others, have been achieved and that there has been provided a do-all agricultural machine, the basic structure of which can be used for all agricultural tasks simply by changing the attachments which are affixed to the bottom of the permanent carrier arms 20. The carrier arms 20 are 50 feet or more in length, so that the machine will cover a 100 foot or more swath of the field during each pass. By so doing, the compaction of the ground, as is produced by conventional equipment, is considerably reduced. Where desired, the do-all machine makes it possible to cultivate wet soil, which conventional machinery would compact excessively. Under wet soil conditions, only the narrow strip of ground over which the wheels of the do-all vehicle pass would be compacted, and even this not too severely, since but a single pass is necessary. The do-all machine, therefore, makes it possible to cultivate and plant soils that are in too wet a condition for tillage by conventional tractors and implements. The same is true of harvesting and other operations.

The embodiment of the do-all machine shown in FIGS. 13 through 17 of the drawings is generally similar to the embodiments previously described, but differs principally therefrom in that the drive for the conveyors, the sickle bar, and the traction units are hydraulic motors which are driven by a hydraulic pump that in turn is driven by the internal combustion engine of the do-all machine. Those portions of the embodiment as shown in FIGS. 13 through 17 which correspond to similar portions in the embodiment previously described are designated by a like reference numeral characterized further in that a suffix "a" is affixed thereto.

Figure 17:
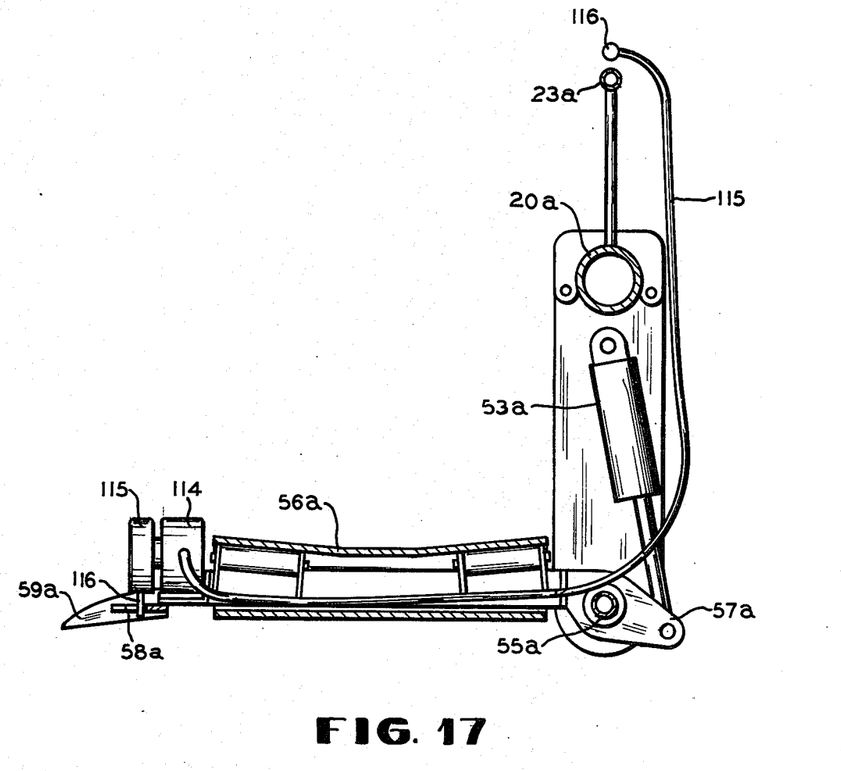
FIG. 17 is a fragmentary sectional view taken approximately on line 17—17 of FIG. 13.

The front conveyor 72a of the underbelly conveyor 71a is driven by the hydraulic motor 110, the elevating conveyor 73a is driven by the hydraulic motor 111; the left lateral conveyor 56a is driven by the hydraulic motor 112; and the right lateral conveyor 56a is driven by the hydraulic motor 113. By driving the outboard pulley of the lateral conveyors, a larger driving pulley can be used than if the conveyors were located adjacent the underbelly conveyor. In addition, driving the outboard pulley keeps the bottom run of the conveyor taunt, so that it does not sag to the ground between supports. As previously indicated, the sickle bars are driven by hydraulic motors. Five oscillatory hydraulic motors 114 are used in the present embodiment so that each sickle bar is no more than approximately 12 feet long. The oscillatory motors 114, shown, are bolted to the conveyor support structure 57a, as best seen in FIG. 17. The rotors 115 of the motors 114 have a depending dog 116 which is received in a suitable opening of the drive bar of the sickle bar cutters 58a to reciprocate the cutters 58a back and forth. Suitable valving is incorporated in the motors 114 to cause the motors 115 to oscillate approximately 20 degrees to either side of the center rotor position. As is well known in the art, hydraulic pressure is supplied to the motors 114 through flexible hoses 115 which are connected to a hydraulic header 116 fastened to the top of the bridging 23 of the carrier arm 20.

Figure 14:
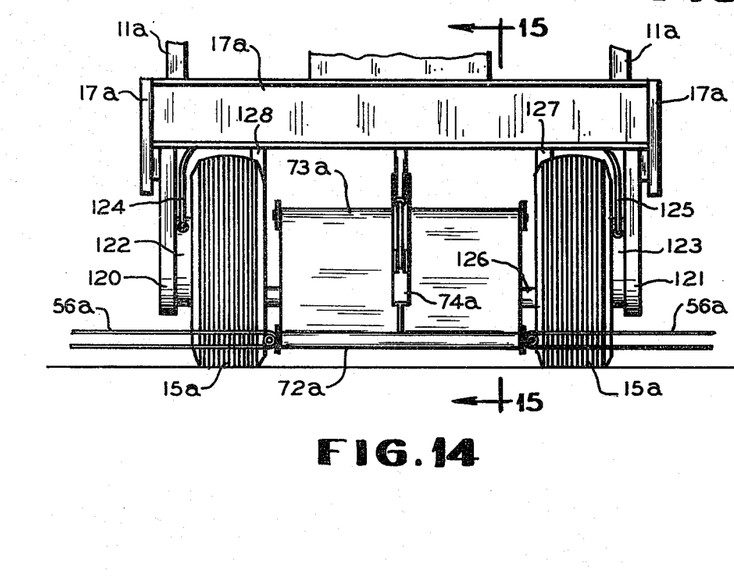
FIG. 14 is a fragmentary frontal view approximately on the line 14—14 of FIG. 13.
Figure 15:
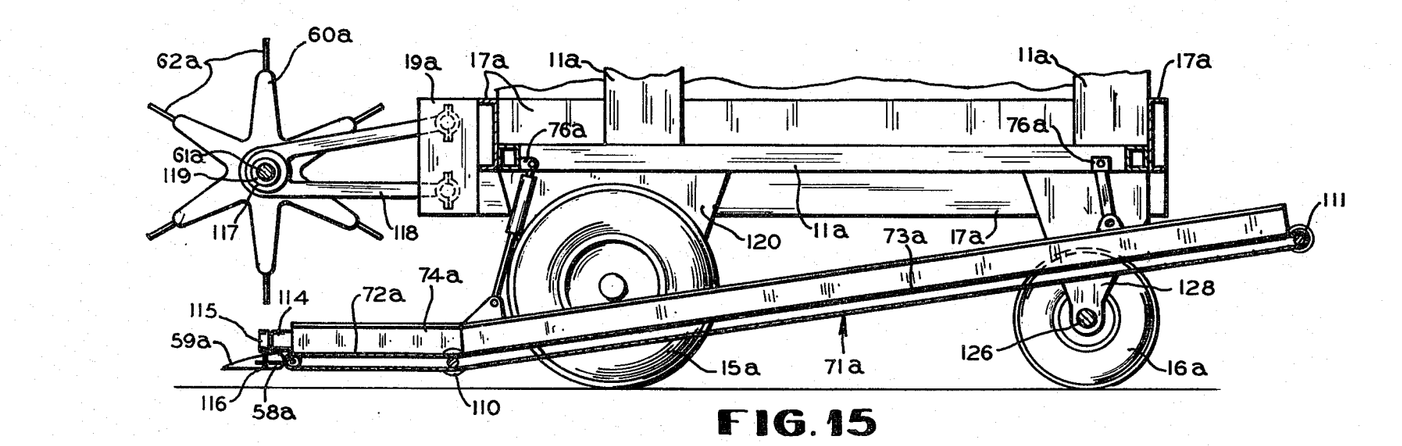
FIG. 15 is a fragmentary sectional view taken approximately on line 15—15 of FIG. 13.

The embodiment shown in FIGS. 13 through 17 is provided with three sections of reel 60a. One section of reel extends from the carrier arm frame 17a over the right lateral conveyor, and another section of reel extends laterally from the carrier arm frame 17a over the left lateral conveyor. As best seen in FIG. 15, the right section 60a is driven by a hydraulic motor 117 which is affixed to a reel support bracket 18 that is affixed to the hinge 19a of the carrier arm frame 17a. A similar hydraulic motor 117 is fastened to the left hinge 19a of the carrier arm frame 17a. The two motors 117 are directly in line and have shaft extensions 119 that project towards each other and to which a short intermediate section of reel can be affixed, when a cutter bar is used to harvest material that is planted in the roadway.

The Do-all machine shown in the drawings has no cross axle between drive wheels 15a; so that the space between the drive wheels and power frame 11a is completely unobstructed for the underbelly conveyor 71a. Outboard pedestals 120 and 121 depend downwardly from the power unit frame 11a at locations outwardly of the center of the drive wheels 15a. The stators 122 and 123 of the hydraulic traction motors are fastened to the pedestals 120 and 121 respectively. The rotors of the hydraulic motors project to the center of the wheels 15a and are bolted to the flanges of the wheels 15a so that the wheels are journaled and driven by the hydraulic motors. Hydraulic pressure is supplied to the motors through conduits 124 and 125 from a central hydraulic pump that is driven by the internal combustion engine of the machine.

Figure 16:
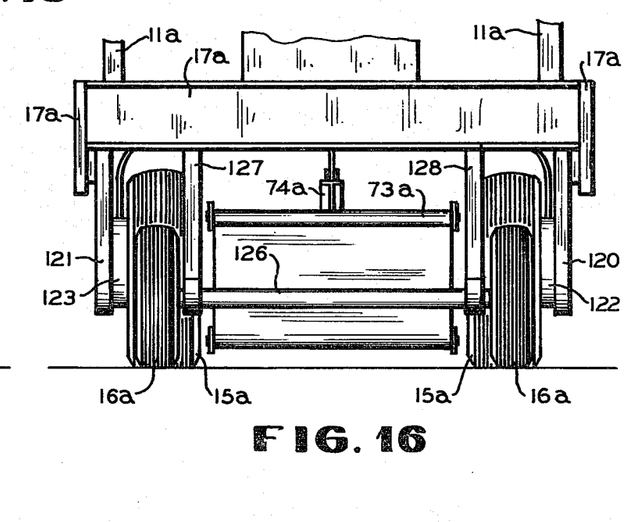
FIG. 16 is a view similar to FIG. 14 but showing the rear of the vehicle.

As best seen in FIG. 16, the rear steerable wheels 16a are supported by a cross axle 126 that is positioned beneath the elevating section 73a of the underbelly conveyor. The frame 11a is supported from the cross axle 126 by pedestals 127 and 128. The stub shafts for the steerable wheels 16a are provided with the usual king pins and steering knuckles, which in turn are fastened to the cross axle 126 as is well known in the art. The steerable wheels 16a are smaller than the drive wheels 15a, so that they have clearance with respect to carrier arm frame 17a and the elevating section 73a of the underbelly conveyor 71a.

As previously indicated, the carrier arm frame 17a extends around the power unit frame 11a and is guided therefrom for vertical sliding movement, so that the carrier arm frame is secured against lateral movement in any direction. As best seen in FIGS. 14 and 15, the front of the carrier arm frame includes a cross channel 17a which is located forwardly of the front of the power unit frame 11a; and the hinges 19a are fastened to the side panels of the carrier arm frame forwardly of the cross channel section. The carrier arms are, of course, securely welded to the hinges 19a. As best seen in FIG. 16, the rear of the carrier arm frame also includes a cross channel 17a to tie the side panels of the carrier arm frame together rearwardly of the power unit frame 11a. In this manner, the carrier arm frame extends around the power unit frame 11a and is guided thereby for vertical movement in a positive and unique manner.

While various changes may be made in the detailed construction, it is understood that such changes will be within the spirit and scope of the present invention as is defined by the appended claims.

I claim:

1. A farm vehicle comprising: a longitudinally extending vehicle frame, ground engaging drive mechanism supporting said frame with clearance from the ground, a pair of implement support booms projecting laterally from opposite sides of said frame, a longitudinally extending underbelly conveyor being supported by said frame in said clearance between said frame and the ground for moving material to the back of said vehicle, and conveyor means on said implement support booms for moving harvested material laterally onto said underbelly conveyor, said conveyor means being positioned forwardly of said ground engaging drive mechanism, and said underbelly conveyor being constructed and arranged to move harvested material from said conveyor means to the rear of said vehicle beneath said vehicle frames.

2. The farm vehicle of claim 1 wherein said conveyor means on said support booms are belt conveyors which extend laterally from opposite sides of said underbelly conveyor, and said support booms support cutter means extending across the front of said underbelly conveyor and said conveyor means on said implement support booms.

3. A farm vehicle comprising: a vehicle frame, ground engaging drive mechanism supporting said frame with clearance from the ground, a carrier arm frame extending around opposite sides of said vehicle frame, guide means operatively positioned between said vehicle frame and said carrier arm frame to restrain lateral movement of said carrier arm frame while allowing said carrier arm frame to be positioned vertically with respect to said vehicle frame, a pair of opposite hand implement support booms, hinge means supporting said implement support booms from said carrier arm frame for movement between incline and generally parallel positions, a longitudinally extending underbelly conveyor in said clearance between said frame and the ground for moving material to the back of said vehicle, and conveyor means on said implement support booms for moving harvested material laterally onto said underbelly conveyor, said conveyor means being positioned forwardly of said ground engaging drive mechanism, and said underbelly conveyor being constructed and arranged to move harvested material from said conveyor means to the rear of said vehicle beneath said vehicle frames.

4. The farm vehicle of claim 3 wherein said conveyor means on said support booms are belt conveyors which extend laterally from opposite sides of said underbelly conveyor, and said vehicle including cutter means extending across the front of said underbelly conveyor and said belt conveyors on said support booms.

5. A farm tractor comprising: a longitudinally extending vehicle frame, ground engaging drive mechanism supporting said frame with clearance from the ground, a carrier arm frame extending around opposite sides of said vehicle frame, guide means operatively positioned between said vehicle frame and said carrier arm frame to restrain lateral movement of said carrier arm frame while allowing said carrier arm frame to be positioned vertically with respect to said vehicle frame, lateral conveyor structure forwardly of said ground engaging drive means, attachment means on said carrier arm frame for supporting said lateral conveyor structure, and a longitudidinally extending underbelly conveyor supported from said frame in said clearance between said frame and the ground for receiving material from structure attached to said attachment means and moving the material beneath said frame to the back of said vehicle, said clearance being large enough to not only receive said underbelly conveyor but to provide clearance on top of the conveyor to receive the harvested material being conveyed to the back of the vehicle.

6. The farm tractor of claim 5 wherein said attachment means is adjustable for raising and lowering said underbelly conveyor, and whereby said underbelly conveyor can be raised into a position adjacent the frame when not in use and when the tractor is to be used for other purposes.

7. A harvesting attachment for a tractor having a laterally projecting boom thereon, said attachment comprising: a plurality of generally vertical support frames having means adjacent to upper ends thereof for securing to the tractor boom, a plurality of conveyor supports respective ones of which are pivotally connected to said generally vertical support frames, adjustable means on said attachment for moving said conveyor supports about their pivotable connection and for normally holding said conveyor supports in a generally horizontal position relative to said vertical support frames, a belt conveyor on said conveyor supports, and a cutter on the ends of said conveyor supports at one side edge of said belt conveyor.

8. The harvesting attachment of claim 7 wherein said adjustable means can move said conveyor supports between generally horizontal and depending positions.

9. An all purpose farming vehicle comprising: a power unit frame, ground engaging traction units supporting said power unit frame, an engine mounted on said power unit frame, a superstructure positioned over said engine and supported by said power unit frame, a carrier arm frame guided by said power unit frame for vertical movement, means attached to said superstructure for raising and lowering said carrier arm frame, an implement carrier arm mounted on and extending laterally from one side of said carrier arm frame, a support member extending between said implement carrier arm and said superstructure, a lateral conveyor supported by said implement carrier arm, and an underbelly conveyor beneath said power unit frame for transferring material from said lateral conveyor on said implement carrier arm to the rear of said vehicle, said ground engaging traction units being constructed and arranged relative to said power unit frame to provide clearance for said underbelly conveyor, said conveyor means being positioned forwardly of said ground engaging drive mechanism, and said underbelly conveyor being constructed and arranged to move harvested material from said conveyor means to the rear of said vehicle beneath said vehicle frames.

10. An all purpose farm vehicle comprising: a vehicle frame, ground engaging drive mechanism supporting said frame with clearance from the ground, a carrier arm frame mounted on said vehicle frame, said carrier arm frame being guided for vertical movement with respect to said vehicle frame, and a pair of opposite hand implement support booms hinged to said carrier arm frame and movable between in-line and generally parallel positions, said implement support booms including a horizontal conveyor positioned generally beneath said booms.

11. The all purpose vehicle of claim 10 having a longitudinal underbelly conveyor in said clearance between said frame and the ground, and said horizontal conveyor discharging onto said underbelly conveyor.

12. The all purpose vehicle of claim 11 having a sickle bar cutter carried by said implement support booms forwardly of said horizontal conveyor, and means carried by said implement support booms in position to move material from said sickle bar cutter to said horizontal conveyor.

13. The all purpose vehicle of claim 9 having a sickle bar cutter carried by said implement support booms forwardly of said horizontal conveyor, and means carried by said implement support booms in position to move material from said sickle bar cutter to said horizontal conveyor.

14. The all purpose vehicle of claim 9 wherein said traction units are mounted inwardly of said power unit frame with the supports for said traction units projecting outwardly of the external surface of said traction units to said power unit frame, and whereby the space between said traction units is kept open for passage of material carried by said underbelly conveyor.

15. The all purpose vehicle of claim 14 wherein said traction units are wheels and the axles for said wheels project outwardly from the outer surface of the wheel to said power unit frame.

16. An all purpose farming vehicle comprising: a pair of laterally spaced apart ground engaging traction units, stub shaft means extending laterally outwardly of opposite sides of said traction units for journalling said traction units, a power unit frame extending generally over said traction units with portions thereof extending downwardly laterally outwardly of said traction units to support said stub shaft means, an underbelly conveyor between said traction units and beneath said power unit frame and running from a position forwardly of said traction units to a position rearwardly thereof, a laterally extending boom on said vehicle, and a laterally extending conveyor on said boom for feeding material onto said underbelly conveyor.

17. The vehicle of claim 16 including steerable wheels on said power unit frame, said steerable wheels being positioned rearwardly of said traction units, with the top surface of said steerable wheels being closer to the ground than is the top surface of said traction units, and said underbelly conveyor raising and passing over the top of said steerable wheels.

18. The vehicle of claim 17 wherein said underbelly conveyor extends forwardly of said ground engaging traction units and said laterally extending conveyor is positioned forwardly of said traction units to discharge onto said underbelly conveyor at a point forwardly of said traction units.

19. The vehicle of claim 18 wherein said laterally extending conveyor extends laterally from the side of said underbelly conveyor.